Figure 1:
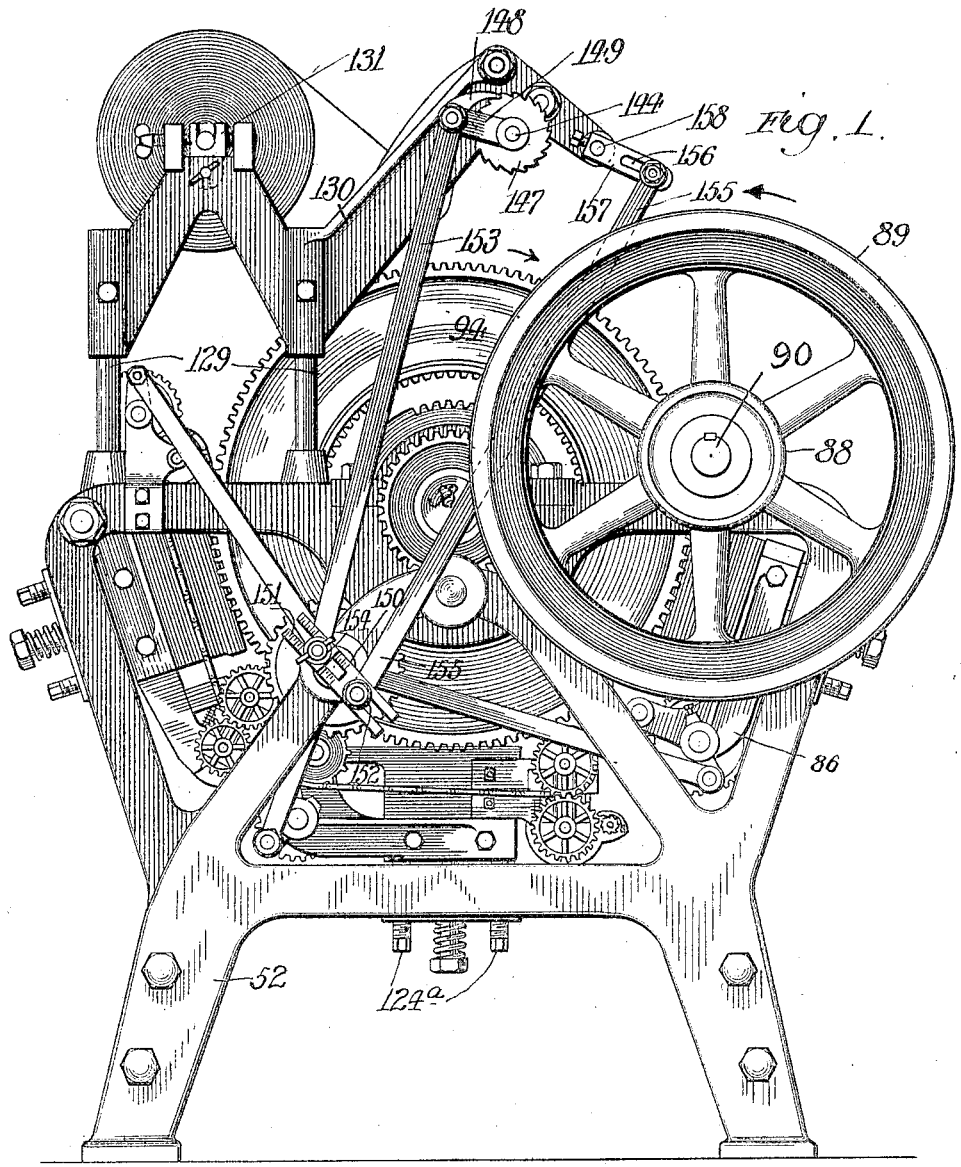

No. 813,124. PATENTED FEB. 20, 1906.
C. WILLIAMS.
MULTICOLOR PRESS.
APPLICATION FILED APR. 1, 1903.

11 SHEETS—SHEET 1.

No. 813,124. PATENTED FEB. 20, 1906.
C. WILLIAMS.
MULTICOLOR PRESS.
APPLICATION FILED APR. 1, 1903.

11 SHEETS—SHEET 2.

No. 813,124. PATENTED FEB. 20, 1906.
C. WILLIAMS.
MULTICOLOR PRESS.
APPLICATION FILED APR. 1, 1903.

11 SHEETS—SHEET 4.

Witnesses:
H. G. Barrett
E. Molitor

Inventor:
Charles Williams
By Coburn & McRoberts
Attys.

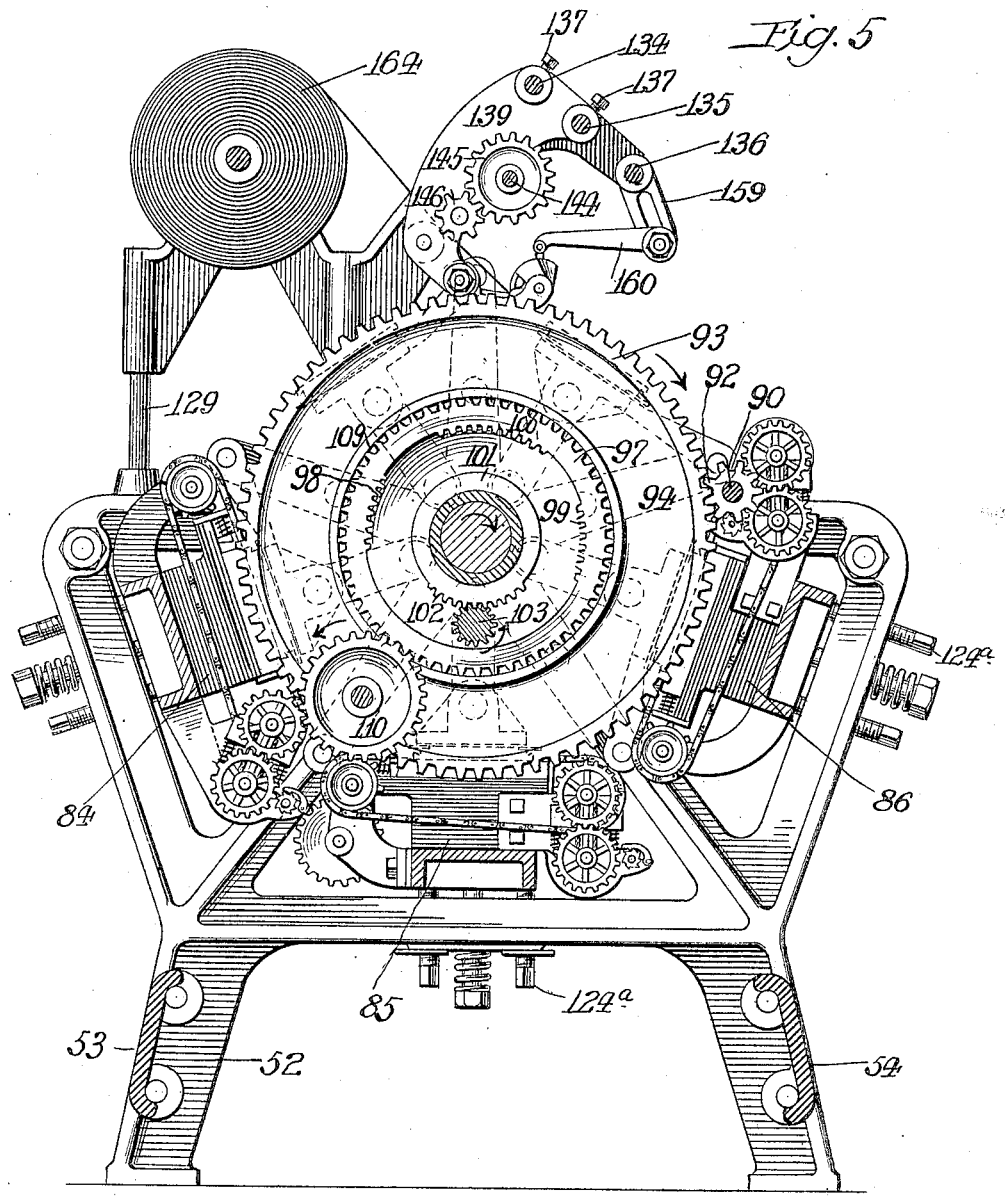

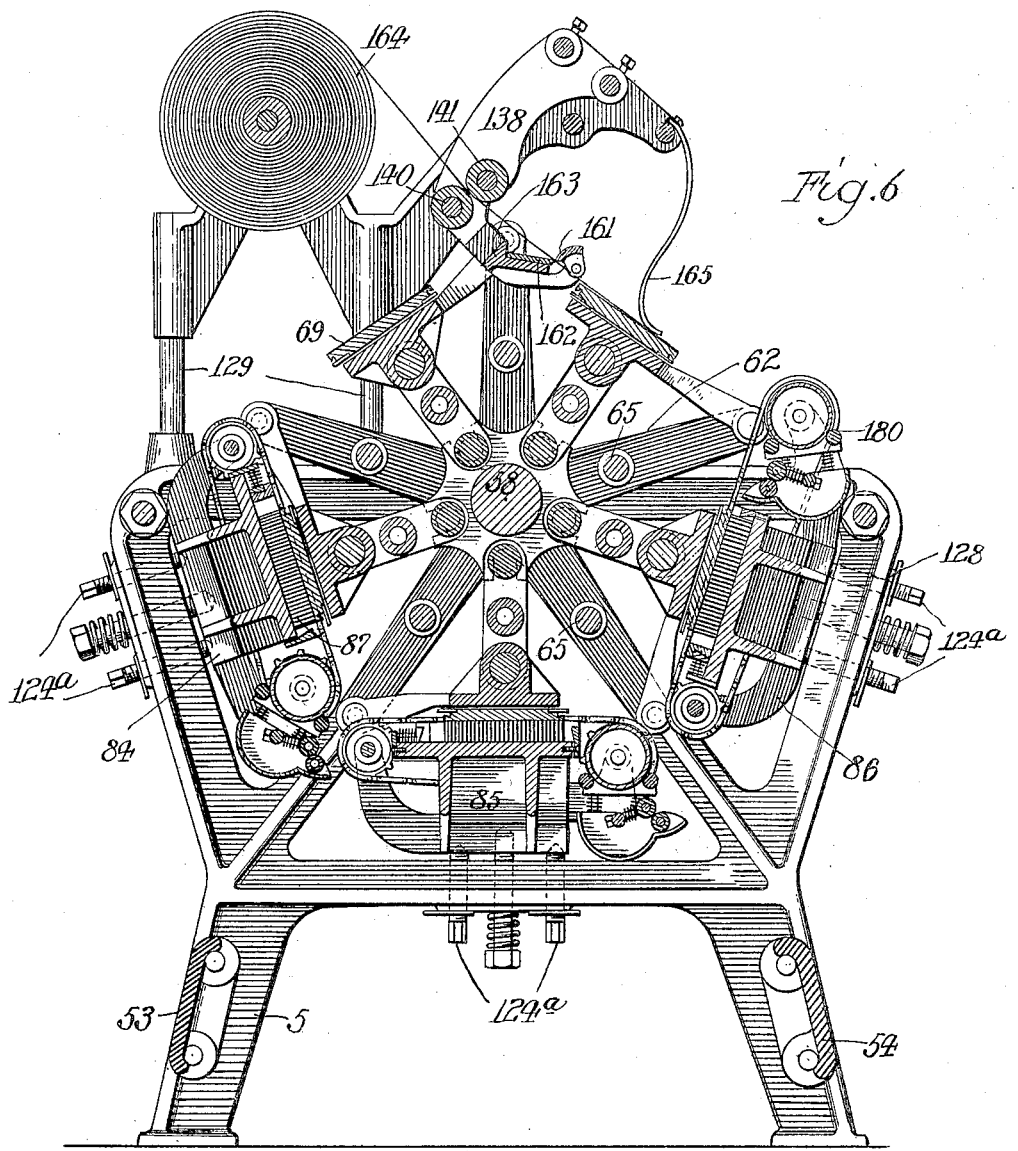

No. 813,124. PATENTED FEB. 20, 1906.
C. WILLIAMS.
MULTICOLOR PRESS.
APPLICATION FILED APR. 1, 1903.
11 SHEETS—SHEET 7.
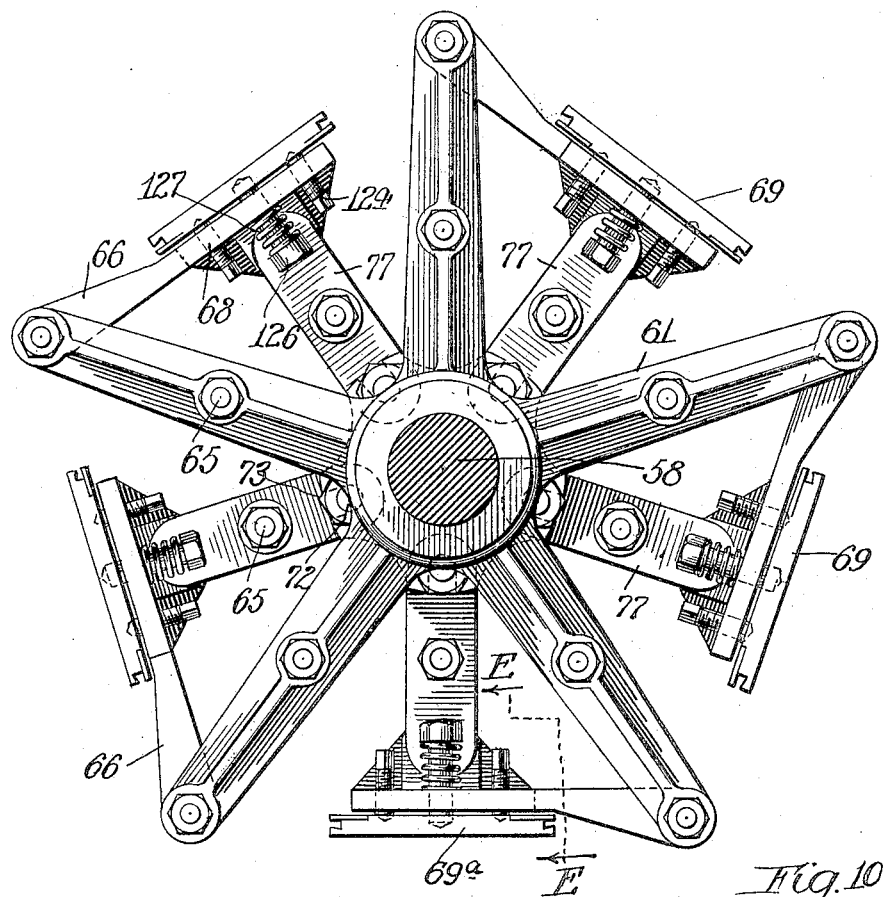
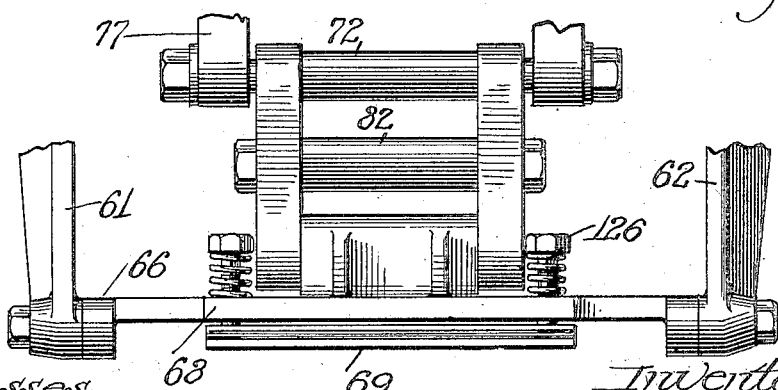

No. 813,124. PATENTED FEB. 20, 1906.
C. WILLIAMS.
MULTICOLOR PRESS.
APPLICATION FILED APR. 1, 1903.
11 SHEETS—SHEET 8.
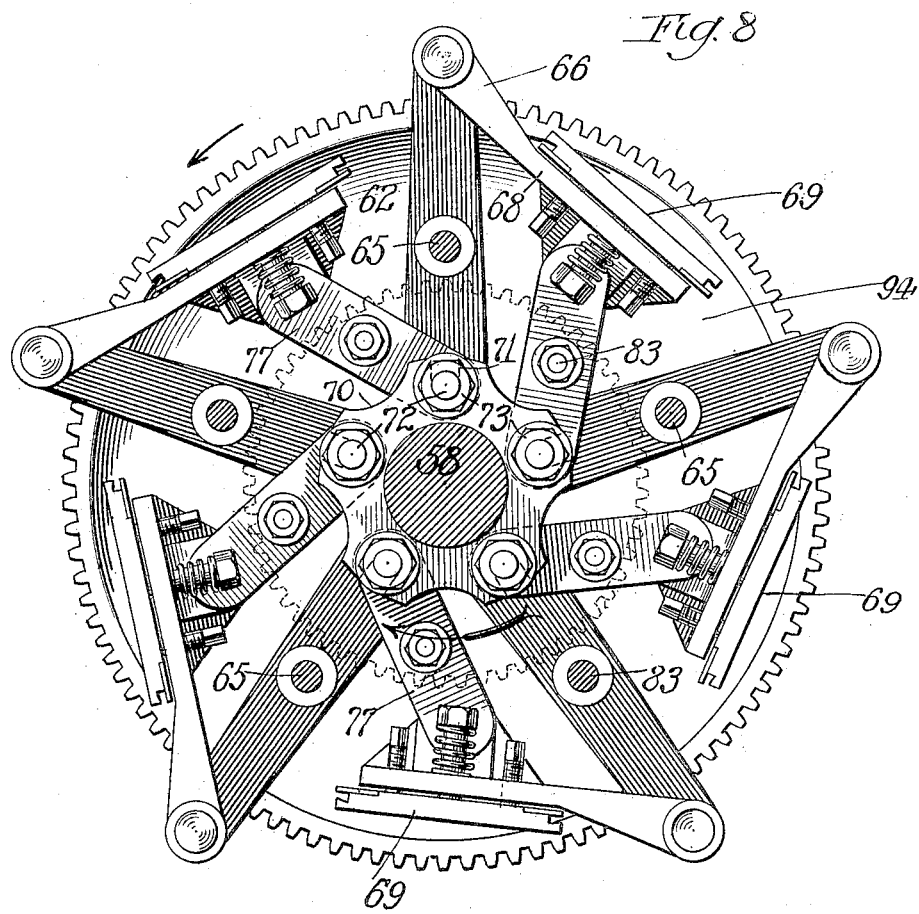
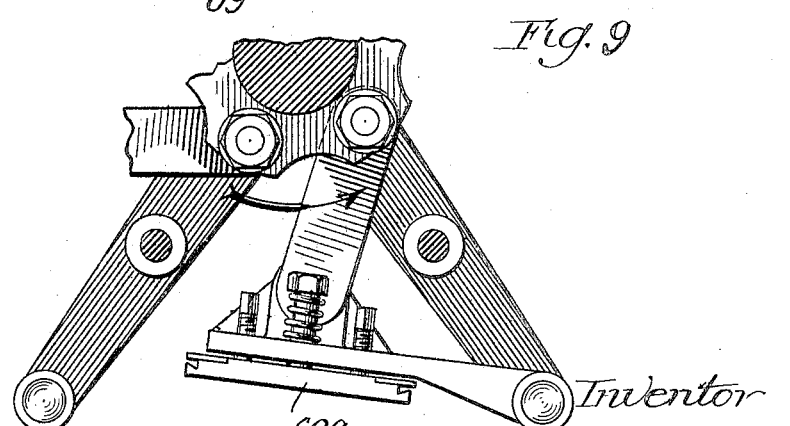

No. 813,124. PATENTED FEB. 20, 1906.
C. WILLIAMS.
MULTICOLOR PRESS.
APPLICATION FILED APR. 1, 1903.
11 SHEETS—SHEET 9.
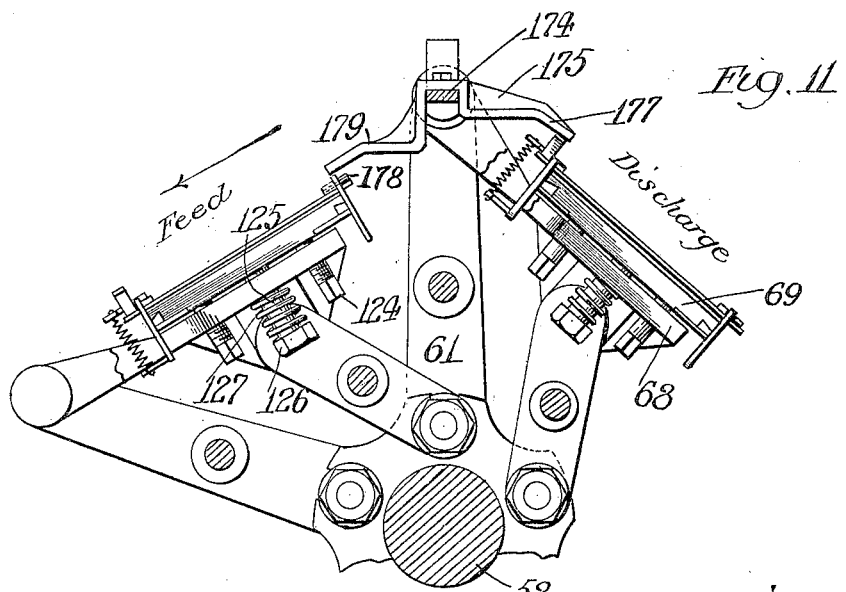
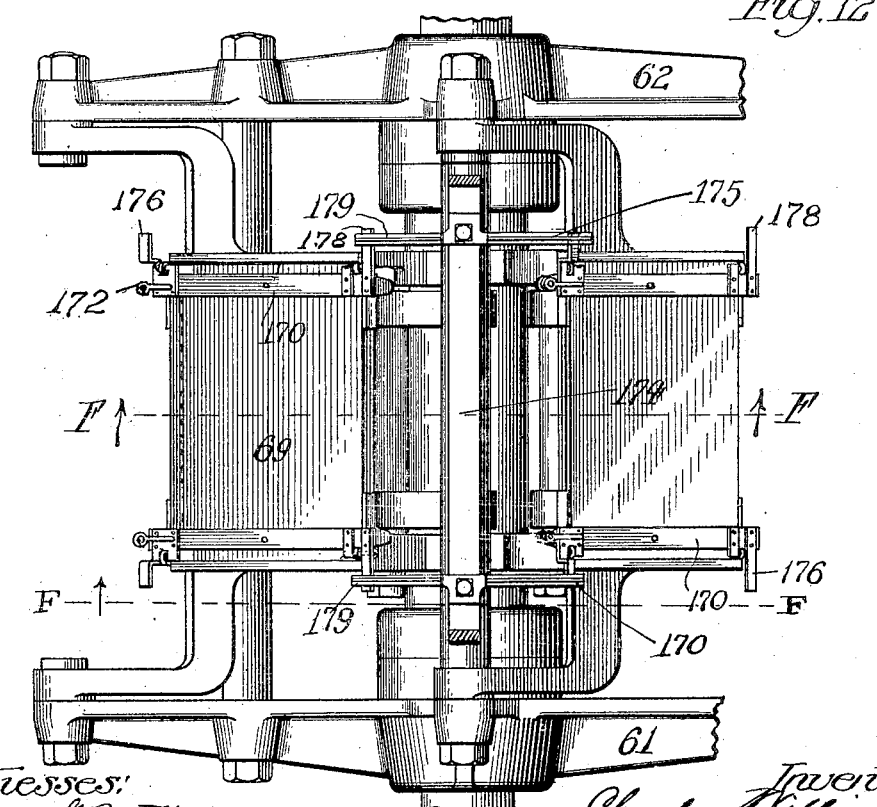

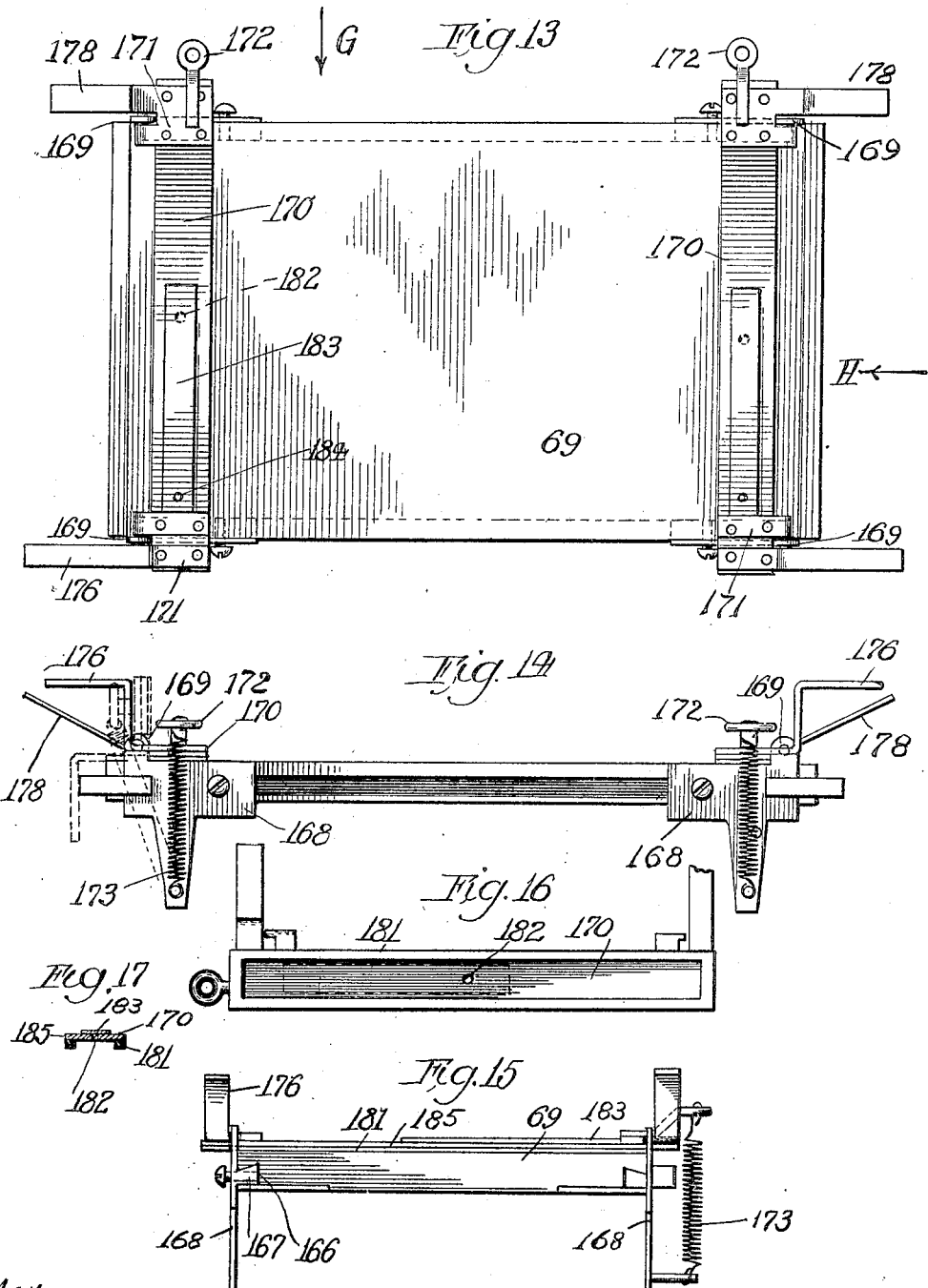

No. 813,124. PATENTED FEB. 20, 1906.
C. WILLIAMS.
MULTICOLOR PRESS.
APPLICATION FILED APR. 1, 1903.
11 SHEETS—SHEET 11.
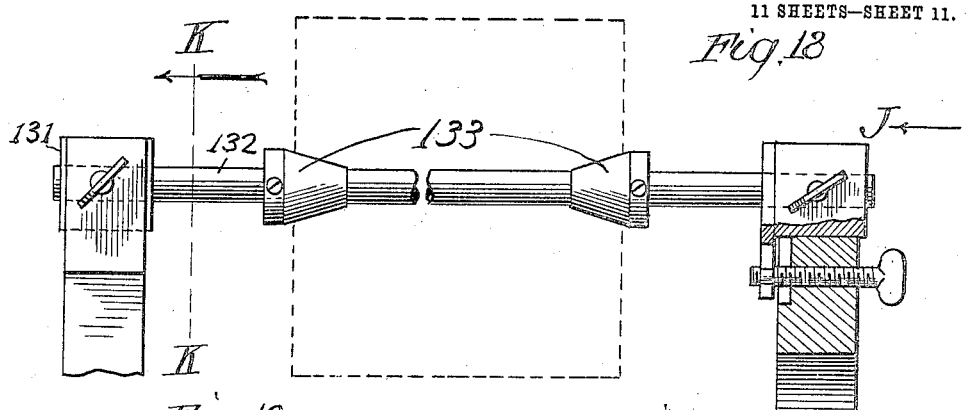
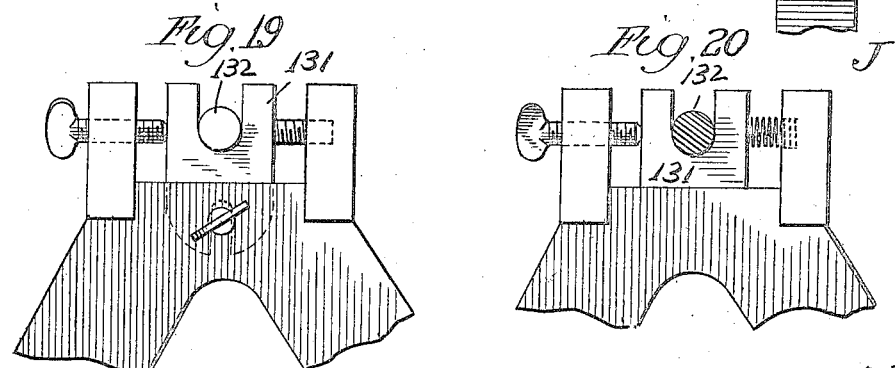
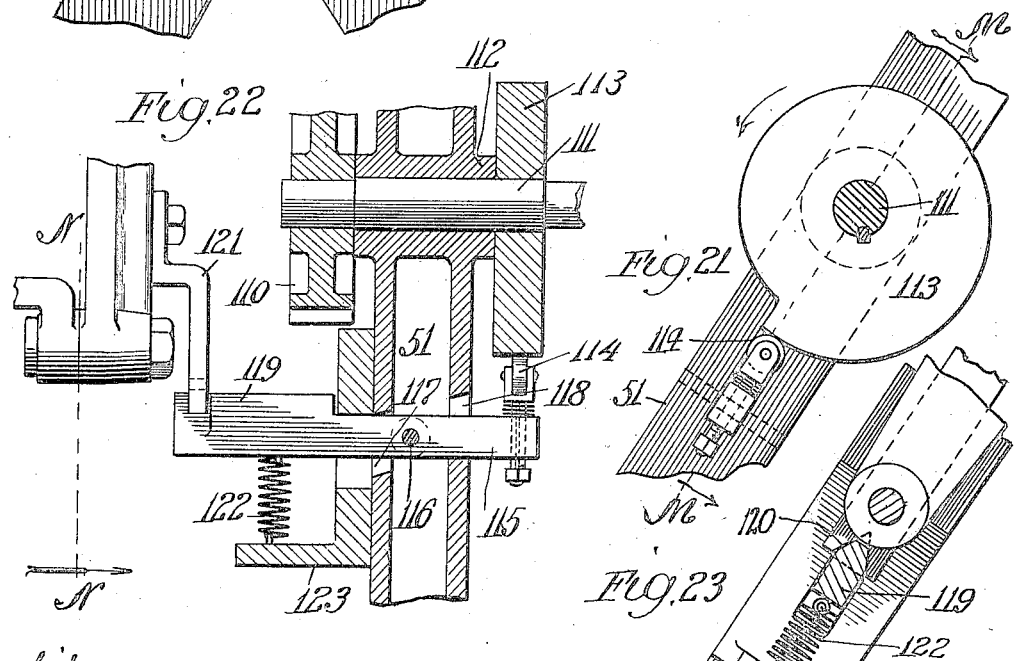
Witnesses:
Harold G. Barrett
L. Molitor
Inventor
Charles Williams
By Coburn & McRoberts,
Attys

UNITED STATES PATENT OFFICE.

CHARLES WILLIAMS, OF SPOKANE, WASHINGTON, ASSIGNOR OF FIFTEEN-SIXTEENTHS TO WILLIAM H. COWLES AND JOHN F. YOUNG, OF SPOKANE, WASHINGTON.

MULTICOLOR-PRESS.

No. 813,124.      Specification of Letters Patent.      Patented Feb. 20, 1906.

Application filed April 1, 1903. Serial No. 150,563.

*To all whom it may concern:*

Be it known that I, CHARLES WILLIAMS, a citizen of the United States, residing at Spokane, in the county of Spokane and State of Washington, have invented certain new and useful Improvements in Multicolor-Presses, of which the following is a specification.

My invention is concerned, primarily, with printing-presses, and especially with that class of presses that are designed to print in more than one color.

In carrying out my invention I have devised a novel arrangement of the forms and platens so that a plurality of stationary forms are employed with which the platens come successively in register to enable me to make the different-colored impressions on the sheet to be printed.

Having thus described the general nature of my invention, I will first describe in detail the constructions and combinations employed and finally point out the novel features, whether adapted for a multicolor-press or for a single-color press, in the claims hereto annexed.

To illustrate my invention, I annex hereto eleven sheets of drawings, in which the same reference characters are used to designate identical parts in all the figures, of which—

Figure 2:
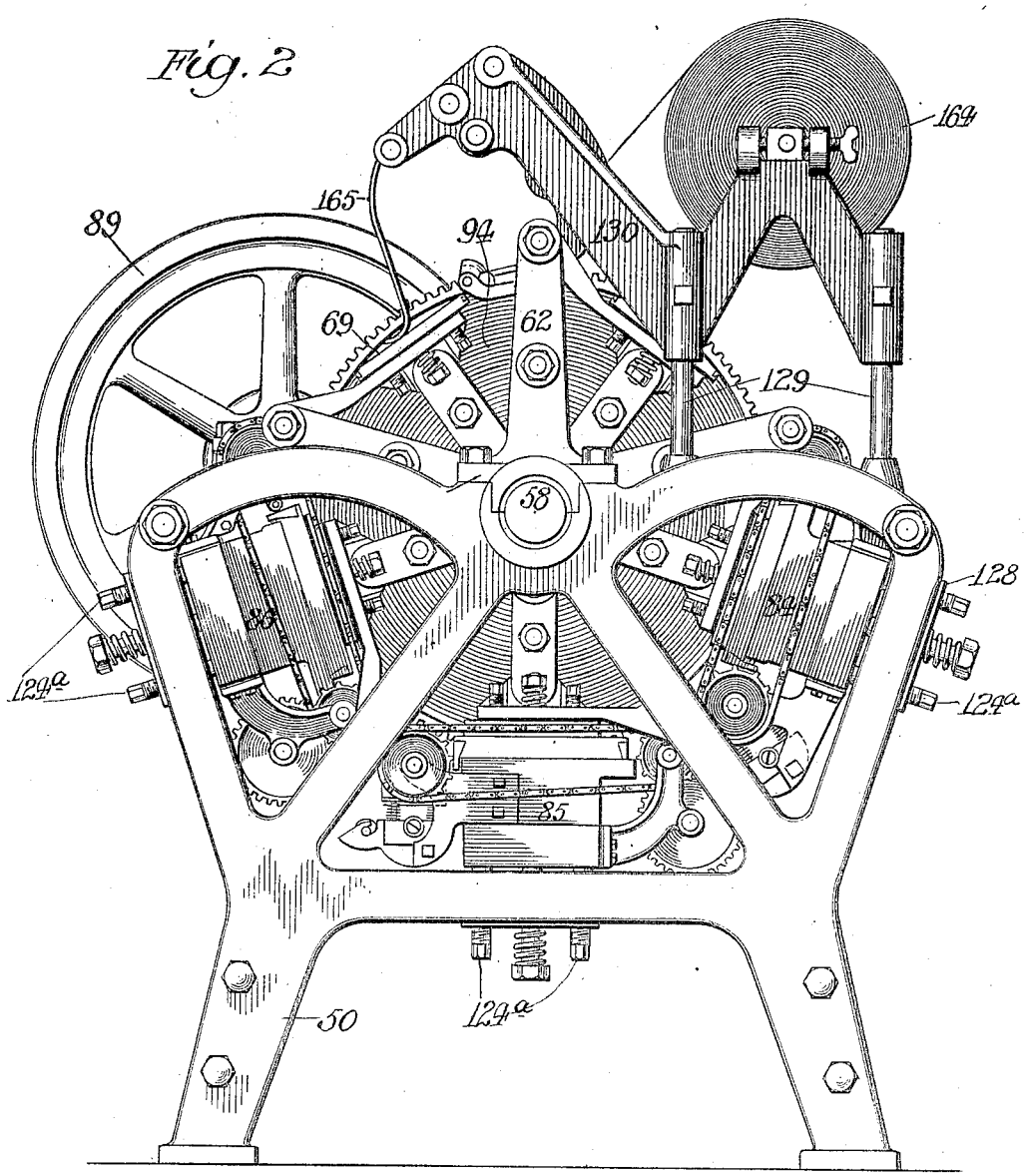
Figure 3:
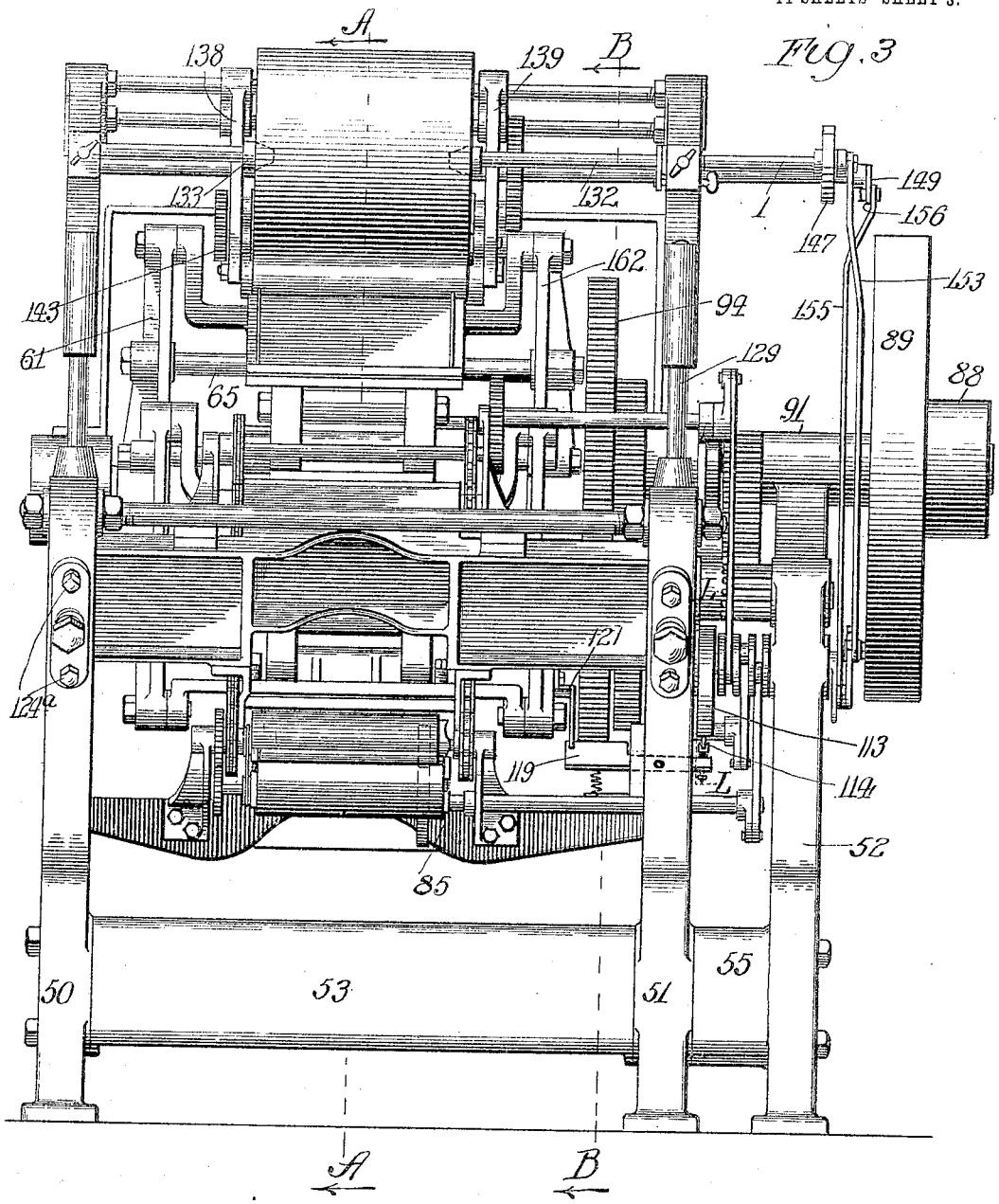
Figure 4:
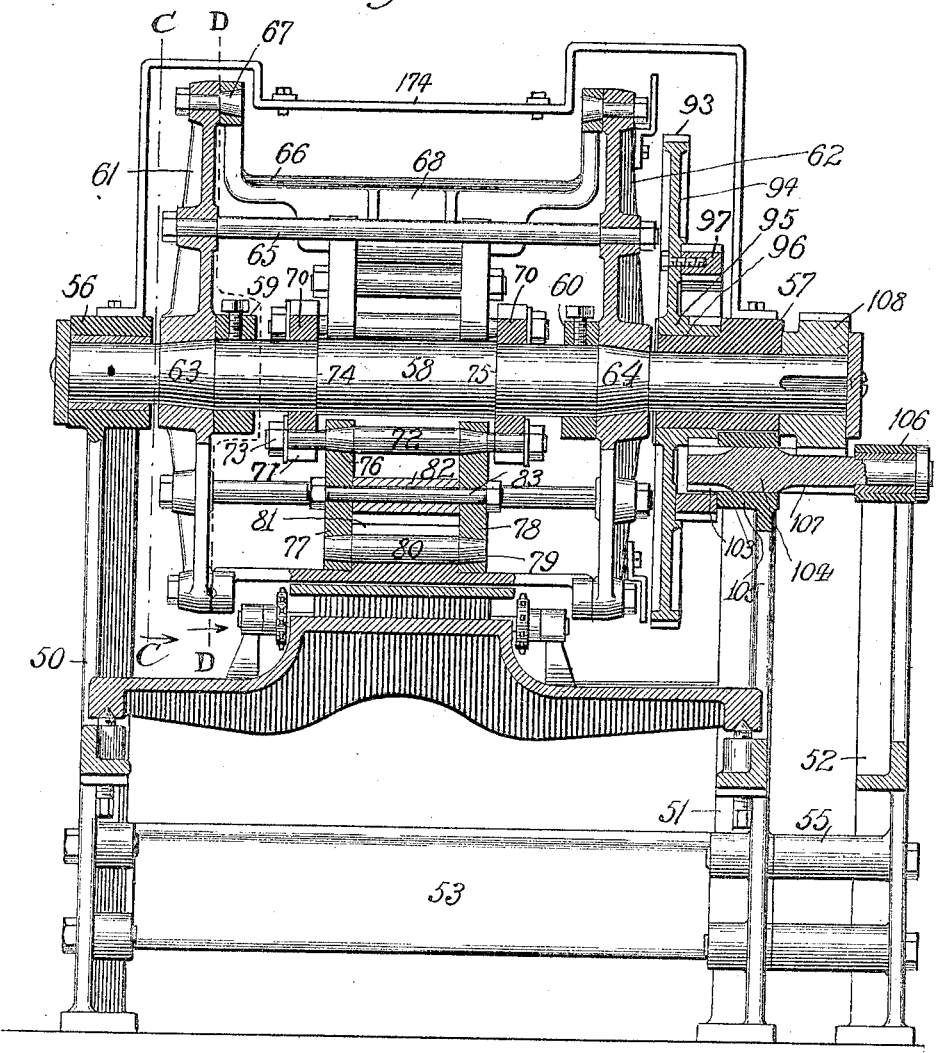

Figure 1 is an elevation of the end of the press to which power is applied. Fig. 2 is an elevation of the other end of the press. Fig. 3 is an elevation of one side of the press. Fig. 4 is a vertical section along the center and through the length of the press. Fig. 5 is a transverse vertical section on the line A A of Fig. 3. Fig. 6 is a similar view on the line B B of Fig. 3. Fig. 7 is a detail in section, on an enlarged scale, on the line C C of Fig. 4, showing the platens at printing position. Fig. 8 is a similar view on the line D D of Fig. 4, showing the platens in their retracted position. Fig. 9 is a detail of the lower part of Fig. 8, showing the platens retracted, but with the toggle-supports therefor in a different position. Fig. 10 is a side elevation of the mechanism shown in the lower part of Fig. 7 as seen from the line E E. Fig. 11 is a vertical section on the line F F of Fig. 12, showing the position of the platens with reference to the machine at the instant that one platen is discharging and another one receiving a sheet. Fig. 12 is a top plan view of the same mechanism. Fig. 13 is a top plan view of a platen and the sheet-holding mechanism connected therewith. Fig. 14 is a side elevation of the same looking in the direction of the arrow G of Fig. 13. Fig. 15 is an end elevation looking in the direction of the arrow H of Fig. 13. Fig. 16 is a bottom view of one of the clamping-bars. Fig. 17 is a vertical section of the same on the line I I of Fig. 16. Fig. 18 is a side elevation showing the spindle by which the roll of paper from which sheets are to be cut is supported. Fig. 19 is a side elevation of the same on the line J J of Fig. 18. Fig. 20 is a similar view on the line K K of Fig. 18. Fig. 21 is a detail of the locking mechanism on the line L L of Fig. 3. Fig. 22 is a section of the same on the line M M of Fig. 21, and Fig. 23 is a vertical section on the line N N of Fig. 22.

Referring first to Figs. 1 to 6, it will be seen that the framework of the machine consists of the three standards 50, 51, and 52, which are of a size and shape adapted to receive the various mechanisms to be hereinafter described. They are spaced apart at the bottom of the machine by the transverse pieces 53 and 54, extending between the standards 50 and 51, and by the projections or sleeves 55, which separate the standards 51 and 52 and which may be integral with the latter standard. Journaled in the bearings 56 and 57, formed in the tops of the standards 50 and 51, respectively, is the shaft 58, which has frictionally mounted thereon and spaced apart by the collars 59 and 60 the pair of spiders 61 and 62. The shaft 58 has a certain amount of movement independent of the spiders 61 and 62, and as I desire to secure an accurate and easily-adjusted alinement I taper the shaft 58 at the portions 63 and 64, with which the complementarily-shaped inner bearing-surfaces of the hubs of the spiders 61 and 62 coöperate. As will be best seen from Figs. 5, 7, and 8, the spiders 61 and 62 have five equidistant and symmetrical arms, which are spaced apart by the five rods or bars 65, furnished with the shoulders and nuts, as clearly shown in Fig. 4. In addition to these rigid cross-bars 65 I employ the swinging yoke-shaped platen-bearing cross-pieces 66, which, as will be seen from Figs. 4 and 5, are journaled on the conical bearing-studs 67, secured in the outer ends of the arms of the spiders. The cross-bar 66 is substantially U-shaped, and the widened central portion 68 serves as a support for the platen proper, 69. Keyed onto the shaft 58 inside of the collars 59 and 60 are the bearing plates or disks 70, which have the five equidistant and symmetrical recesses 71 in the periphery thereof to receive the bearing-rods 72, which are rigidly secured in place between said collars by the nuts 73 at their ends. To assist in spacing the collars 70, I preferably form the oppositely-directed shoulders 74 and 75 on the shaft 58, against which the collars 70 abut and where they are held by the bolts or bearing-rods 72. The bearing-rods 72 are provided with the oppositely-directed conical bearing-surfaces 76, facing outward, with which coöperate the complementary bearing-apertures in the two bars 77 and 78, which are also similarly supported at their other ends by the oppositely-directed conical bearing-surfaces 79, formed on the ends of the bearing-rod 80, which coöperate with the complementarily-shaped bearing-recesses in the plates or bars 77 and 78. The rod 80 is supported and rocks in a bearing 81, projecting upwardly from the platen, (when in its lowermost position,) so that if the parts be in the position shown in Fig. 8 or 9 and the shaft 58 is rocked so as to carry the bars 77 and 78 to the radial position shown in Fig. 7, the five toggle-joints formed by the mechanism described will be straightened out, so as to carry the platens 69 outward to the printing-point. In order to space the bars or plates 77 and 78 apart the proper distance so that the proper amount of friction and freedom of movement will be allowed between the conical bearings 76 and 79 and the plates 77 and 78, I interpose between said plates the sleeve 82, through which and coöperating apertures in the plates 77 and 78 the clamping-bolt 83 passes, so that by tightening the bolts 84 on the end of said rod the plates 77 and 78 will be spaced apart the proper distance.

Referring now to Figs. 3, 4, and 5, it will be seen that I connect the standards 50 and 51 by the three bed-plates 84, 85, and 86. The details of these connections will be described more at length hereinafter, and for the present it is only necessary to say that the bed-plates face and are equidistantly spaced from the shaft 58 and are separated by angular spaces of seventy-two degrees, so that the platens 69 will come in register therewith as they are moved through intervals of seventy-two degrees to take the impressions from the type 87, carried by said bed-plates. Referring now especially to Figs. 7 to 9, it will be apparent that the lowermost platen, which I will designate 69ª in these figures, is at the printing position and that any further movement of the shaft 58 in either direction from the position of Fig. 7, if the spiders 61 and 62 be held from rotation, will cause the platens 69 to be withdrawn, owing to the fact that thereby the toggle is broken. In Fig. 8 the effects of rotating the shaft 58 clockwise are seen. In Fig. 9 the effects of rotating the shaft in the opposite direction are seen, the effects on the movement of the platen being identical. If now with the platens retracted and the parts in the position shown in Fig. 8 the spiders 61 and 62 be unlocked, so that they are free to move with the shaft 58, and the shaft 58 be moved forward or clockwise (as seen from the position of that figure) through an angle of seventy-two degrees, the relative position of the parts shown in Fig. 8 will not be changed, although the platens will have advanced to be opposite the next bed-plate. To now get an impression from the new type-surfaces, it is necessary to lock the spiders 61 and 62 from rotation and to rotate the shaft 58 backward, which will bring the parts to the position shown in the fragmentary view Fig. 9, the impression having been made when half of the movement was completed and the rest of the movement being devoted to withdrawing the platen. The spiders are now unlocked and the shaft 58 is rotated forward—i. e., clockwise— through a space of seventy-two degrees, carrying with it all the parts in the position shown in Fig. 9. At the end of the seventy-two-degree movement the spiders are again locked, and in order to get an impression from the new type-surfaces to which the platens have been brought it is necessary to rotate the shaft 58 forward again, during which rotation the platen is forced to the printing-point and withdrawn, leaving the parts again in the position shown in Fig. 8. From a careful consideration of this mode of operation of the machine it will be apparent that it is necessary, starting from the position of the parts shown in Fig. 8, in which it is assumed that an impression has just been made, first, to advance the shaft and the spiders seventy-two degrees; second, to reverse the shaft while the spiders are locked to take the impression; third, to advance the shaft seventy-two degrees with the spiders unlocked to bring it to a fresh printing-surface, and, fourth, to advance the shaft 58 with the spiders locked as far as it was reversed during the second movement to take the second impression, which completes the cycle of movements.

Referring now to Figs. 3, 4, and 6, it will be seen that I employ a belt-wheel 88, which is preferably secured to a fly-wheel 89, both of which are secured to a shaft 90, (see Fig. 5,) mounted to rotate in the bearing 91, formed on the top of the standard 52. The inner end of the shaft 90 carries a gear-pinion 92, which meshes with the peripheral gear-teeth 93 of a wheel or disk 94, which will thus be seen to be in continual rotation. This disk 94 is loosely mounted, by means of the hub 95, on the bearing 96, formed on the outer side and inner end of the bearing 57 for one end of the shaft 58. The disk 94 is provided on its face with the annulus 97, which has at one point of its inner surface the seven gear-teeth 98 and substantially diametrically opposite thereto the similar number of gear-teeth 99. Midway between these two sets of gear-teeth on one side is another set 100, which, however, has eleven gear-teeth instead of seven. The hub 95 of the wheel or disk 94 is provided with the mutilated gear 101, whose eleven teeth 102 are substantially diametrically opposite to the teeth 100 on the flange 97. These sets of gear-teeth 98, 99, and 100 are adapted to mesh with a gear-pinion 103 on the under side thereof and rotate it three times in succession, giving it a greater rotation during the intermediate one than during the two end ones. The geer-teeth 102 engaging it on the upper side give it a rotation in the opposite direction to the same extent as that of the intermediate rotation by the teeth 100. The pinion 103 is formed on the inner end of a horizontal shaft 104, mounted to rotate in the bearings 105 and 106, formed in the tops of the standards 51 and 52, respectively. The pinion 103 has fourteen teeth thereon, and between the bearings 105 and 106 is formed another pinion 107, having twenty teeth thereon and meshing with a gear-pinion 108, splined on the end of a shaft 58 and having fifty teeth. From a consideration of these ratios it will be apparent that when the teeth 98 and 99 (seven each) engage the pinion 103 they will rotate it one hundred and eighty degrees in one direction and that as the gear-pinion 107 has twenty teeth and the gear-pinion 108 fifty teeth this one-hundred-and-eighty-degree movement of the pinion 103 will serve to advance the pinion 108 through ten of its teeth, or seventy-two degrees, which, it will be remembered, is the amount that the shaft 58 and the spiders 61 and 62 must be advanced at every other movement of the shaft 58. By reference to Figs. 4 and 5 it will be apparent that when the pinion 103 is engaged by the teeth 98, 99, or 100 it cannot be in engagement with the teeth 102, so that the shaft 58 is rotated in the opposite direction independently of the disk 94 and at a different rate of movement. When the teeth 102 are in engagement with the pinion 103, it will be apparent that while the disk 94 is rotating independently of and at a different rate of speed from the shaft 58 it is rotating in the same direction.

Referring now to Fig. 6, the sequence of movements of the parts can now be understood. With the parts exactly as shown in that figure the platens are at the printing-points, the parts being in the position shown in Fig. 7. When the disk 94 has advanced clockwise a sufficient distance to free the pinion 103 from the teeth 102, the platens have been retracted and the parts are in the position shown in Fig. 9. As the teeth 99 engage the pinion 103 on the opposite side the spiders are unlocked and the platens and shaft are advanced through seventy-two degrees to the fresh printing-surface. The parts are still in the relative position shown in Fig. 9. The teeth 100 now engage the pinion 103, the spiders being locked, and cause the printing to be effected and the parts to be moved from the position shown in Fig. 9 to that shown in Fig. 8. The amount of angular movement given to the shaft 58 during these printing movements is about one hundred and twelve degrees, more angular movement of the shaft 58 being required for the printing than for the advancing of the platens. The amount of the alternate backward and forward movements of the shaft is of course always equal. The teeth 98 now engage the pinion 103 and, the spiders being unlocked, the whole mechanism is advanced through the seventy-two degrees to the fresh type, the parts being in the position shown in Fig. 8. The teeth 1 2 engaging the pinion 103 on the opposite side, the spiders being locked, now force the platens to the printing-point and withdraw them, the backward movement of the shaft 58 thus changing the position of the parts from that shown in Fig. 8 to Fig. 9.

The mechanism for locking and unlocking the spiders at the proper time will next be explained, reference being had especially to Figs. 3, 5, and 19 to 21. The flange 97 has on its outer periphery a set of gear-teeth 109, twice the number of the gear-teeth constituting the periphery of the gear-wheel 110, with which it meshes. This gear-wheel 110, as best seen in Fig. 22, is secured on the outer end of a shaft 111, journaled in bearings 112, formed in the standard 51, and provided on the other side of said standard with the cam-disk 113. Coöperating with this cam-disk 113 is a bearing-surface, preferably in the form of an antifriction-roller 114, carried on the end of a lever 115, suitably pivoted at 116 to the standard 51 and extending through the recesses 117 and 118 therein. The locking-blade portion 119 of the lever 115 is normally held out of engagement with the notch 120 in the outer end of the bracket 121, carried by each of the arms of the spider 62, by a retractile spring 122, secured to the under surface of the lever 115 and to the upper surface of the projecting bracket 123, secured to the standard 51. The action of this spring is to keep the artifriction-roller 114 in contact with the periphery of the cam 113. As the gear-wheel 110 makes two revolutions to each revolution of the disk 94, it will be apparent that this lock will be applied at equal intervals twice during the cycle of movements described and that it is simply necessary to so time the parts that the lock will be applied when the printing is to be effected and withdrawn when the platens are to be advanced.

It is obvious from the foregoing that in the operation of the machine the rotatable member provided by the spiders and on which the platens are mounted is rotated intermittently to bring the platens successively into register with the type-beds, that the member is locked against movement between its intermittent movements, and that while so locked and the platens are in register with the type-beds the platens are moved independently of the rotary member into contact with the type-beds to take the impressions.

It will be apparent to any one familiar with the printing art that it is necessary to secure accurate adjustment of the platens and the type-carriers in order to secure perfect impressions. For this purpose I employ in connection with each end of each of the platens, as seen in Fig. 11, a pair of adjusting-screws 124, which are screwed through the platen-supporting plate 68 and serve to determine very accurately the utmost limit of the inward movement of the platen 69. To hold the platen 69 in engagement with the ends of these screws 124, I pass a stud or screw 125, having the head 126 thereon, through the end of the part 68 and interpose strong helically-coiled expanding springs 127, surrounding the studs 125, between the heads 126 and parts 68, which serve to hold the platen 69 firmly in engagement with the ends of the screws 124. As will be best seen from Figs. 2 and 4 to 6, I employ the same method of adjustment for each end of the type-carrier plates 84, 85, and 86. In connection with the set-screws 124ª, which I employ for adjusting the type-bars, I provide indexes 128, which, coöperating with a graduated scale, enable me to determine just how much of an adjustment should be given to each screw in changing from a paper of one thickness to a paper of another thickness.

It will be apparent that with my invention it is an extremely easy matter to get the parts in correct register and adjustment. After setting one of the type-carriers to some convenient intermediate position the platen coöperating therewith is adjusted, by means of its set-screws, until it is in perfect registration. The platens are successively adjusted to the type-carrier which has been adjusted, and after the adjustment of the platens is completed the remaining type-carriers can be adjusted to one of the platens, when they will all be found to be in registration.

While I may employ any kind of a feeding mechanism that can be adapted to this machine, I preferably employ the one to be described, which I have here disclosed in order to show its relation to the machine as a whole and in order that the claims for the machine as a whole may be drawn with proper feeding mechanism as an element irrespective of the kind of paper-feeding mechanism employed. While I do not herein claim this paper-feeding mechanism, it will be understood that it is the subject-matter of my application, Serial No. 150,565, filed April 1, 1903, for improvements in feeding mechanisms.

At either end of the machine are a pair of vertical standards 129, upon which is placed the yoke-shaped portion of the side pieces 130 of the paper-supporting mechanism. The top of the yoke-shaped portion of the side pieces 130 is provided with a bearing-box 131, which is preferably adjustable. Journaled in and extending between these bearings is the shaft 132, which is provided with a pair of cones 133, which can be adjusted on said shaft as the size and position of the paper may require. Extending between the uppermost and forward portions of the frame-pieces 130 are two parallel rods 134 and 135. Beneath and forward of these supporting-rods is a rock-shaft 136, similarly mounted and extending between said frame-pieces 130. Supported on the rods 134 and 135 and adjustably secured in any desired position thereof by the set-screws 137 are the feeding frame-plates 138 and 139. (Best shown in Figs. 3 and 6.) Journaled in suitable bearings in the sides of these plates 138 and 139, as best shown in Fig. 5, are a pair of contacting feed-rollers 140 and 141, which are in contact with each other and preferably faced with some yielding material and compelled to move together by the pair of equal-sized intermeshing gears 142 and 143, secured on the outer ends of the shafts constituting the bases of the rollers 140 and 141, as best shown in Fig. 3. Journaled in suitable bearings formed in the plate 139 and in the adjacent frame 130 is a shaft 144, which has splined thereon adjacent the plate 139 a gear-wheel 145, which meshes with a gear-pinion 146, secured on the adjacent end of the shaft of the feed-roller 141. On the extreme outer end of the shaft 144, outside of the frame-piece 130, is secured a ratchet-wheel 147, which is engaged by an operating-pawl 148, pivotally mounted on the arm 149, swinging on the outer end of the shaft 144. The shaft 111 is extended out through the standard 52, part of it being eccentric, as seen in Fig. 3, and has secured thereto outside of said standard 52 an arm 150, one end of which has an elongated slot 151 therein, while the other end has a similar slot 152 therein. A link 153 is pivotally secured at its upper end to the arm 149 and likewise pivotally secured at its lower end to an adjusting-block 154, which can be secured in any desired position of adjustment in the slot 151, so that as the shaft 111 is rotated the length of throw given thereby to the arm 149 will be varied in order to feed out the exact amount of paper that may be necessary for the printing in hand.

The slot 152 has the lower end of a link 155 secured therein and adjustably, if desired. The other end of said link 155 is adjustably secured in the slot 156, formed in the arm 157, secured on the shaft 136, journaled in the side pieces 130. Referring now to Figs. 5 and 6, it will be seen that I secure to the shaft 136 at a suitable location, preferably adjacent the paper-feeding plate 139, a slotted arm 159, in which is adjustably mounted a link 160, the other end of which is pivotally secured to a helical knife-blade 161, suitably supported between the plates 138 and 139, being journaled in or on studs on said plates. A ledger-plate 162 is supported at the proper position in relation to the movement of the knife 161 by means of the cross-piece 163, extending between the plates 138 and 139. In a general way the operation of this device will be readily apparent. While the spiders are stationary, the paper 164 is fed through the rollers 140 and 141 by the mechanism described into position to be cut off and discharged upon the platen 69 in its proper position for printing.

The mechanism for holding the sheet in position on the platen will next be described, and it will be understood that this mechanism might be used in connection with a hand-feed or any other feed instead of the specific form which I have devised and shown.

Referring now especially to Figs. 4 and 11 to 17, it will be seen that in connection with the front and rear edges of each of the platens 69 I form a dovetailed groove 166, in which is mounted the complementarily-shaped rib 167, secured on the inside of the plate 168. By the employment of these grooves it will be apparent that it is possible for me to adjust the clamps to the exact width of the paper that is being printed. Each of the plates 168 is provided at its outer upper corner with the upstanding ear 169, and pivoted in these ears and extending across the platen is a clamping-bar 170. The bar is pivoted in the ears 169 through the intervention of pintles carried by the plates 171, secured on the outer ends of the clamps 170. The plates are provided at one end (as shown, the rear end) with the eye 172, which has connected therewith the contractile spring 173, secured to a projection from the lower side of the plate 168, so that it will by its tension hold the clamp 170 down, as shown in full lines in Fig. 14, or up, as shown in dotted lines. Arrangements must be made for throwing the clamps 170 to their vertical inoperative positions as each platen passes into the new position after the last type-form has been passed, so that the printed sheet will slide off from the platen, and to throw them in the opposite direction at the next station after the paper has been put in position on the platen. To accomplish this result, I provide at each end a pair of cams which are supported by a bar 174, (shown only in Figs. 4, 11, and 12 and omitted from the other figures,) which is supported from the bearings 56 and 57 and is of a substantially inverted-U shape with its central portion depressed in order to bring the cams supported thereby within range of the fingers which they operate. The cam-pieces 175 are shown in side elevation in Fig. 11 and in top plan view in Fig. 12, they being adjustably supported on the bar 174 to accommodate them to the different sizes of paper which may be employed. As the platen comes up to the discharge position shown at the right hand of Fig. 11 the upper horizontal arm 176 of an angular extension of the rear plate 171 comes into contact with the finger 177, forming a part of the cam-piece 175. This contact is due to the outward movement of the platen caused by the printing movement thereof. This causes both the clamps 170 to be rocked from the full-line position of Figs. 13 and 15 to the dotted-line position of Fig. 14; but it will be seen that with the clamps raised the sheet of paper will be free to slide off, its movement being assisted by the further tilting of the platen toward the vertical as it is drawn back from the printing position. At the same time that the sheet ready for discharge has been released the sheet ready for printing has been fastened in place by means of the inclined cam-finger 178 at the other end of the clamp 170 coming in contact with the cam-finger 179, located on the cam-piece 175. The finger 178 is a spring-finger, which yields on contact with the cam 179 on the outward movement of the platen, but which cannot yield on the return or inward movement, so that the fingers 178 contacting with the cams 179 as the platen retracts throw the clamps 170 into locking position. The movement of these parts is to throw the clamps down while the paper is still held if it is manually fed or while the springs 165 are still in contact with it if the feeding mechanism illustrated has been employed.

While I might employ plain clamping-bars 170, such as have been hitherto described, I preferably construct them as will now be described in order that they may positively lift the paper from the platen as they are turned upward to release it on the bottom of each of the clamping-bars 170. As best seen in Figs. 16 and 17, I form a flange of soft rubber 181, which entirely surrounds the outer edge of the bottom of said clamping-bar and which is slightly compressed when the clamping-bar is held down by the spring 173. In the center of the clamping-bar I form a countersunk perforation 182, and on the upper surface of the clamping-bar I place the leaf-spring 183, secured to the clamping-bar at its outer end, as by the rivet 184. I may secure on the under side of the leaf-spring 183 at the point that it covers the aperture 182 a pad 185, of soft rubber or some other elastic material, which tends to make an air-tight closure between the leaf-spring 183 and the aperture 182. The operation of this mechanism will be readily apparent. When the clamping-bars 170 are brought down on a sheet of paper to hold it in place, the rubber 181 is compressed, and the compressed air between the platen and the clamping-bar is permitted to escape through the aperture 182, the pressure of the air being sufficient to raise the outer end of the leaf-spring 183. When the operation is reversed and the clamping-blades 170 are lifted to release the paper, the expansion of the compressed rubber 181 serves to form a slight vacuum between the bottom of the clamping-bars 170 and the sheet of paper upon which they operate, this vacuum causing the paper to adhere to the bottoms of the clamping-bars until they are separated by their angular movement, so that they must be pulled off of the sheet and the vacuum released. This pulling off, however, does not occur until the sheet has been lifted entirely off and freed from the platen 69, so that when it is freed from the clamping-bars it will slide off without any unnecessary adhesion to the platen.

In connection with each of the type-carriers 84, 85, and 86 I have illustrated an inking mechanism 180, which I will not herein describe or claim, as it is the subject-matter of my application, Serial No. 150,566, filed April 1, 1903, for improvements in inking mechanisms, and it is sufficient to say that it constitutes a mechanism peculiarly adapted for a machine of this character in which the inking-rollers are traversed over the distributing-roller and then over the type-surface and returned by a reciprocating movement during the interval between impressions.

While I have shown and described my invention as embodied in the forms which I at present consider best adapted to carry out its purposes, it will be understood that it is capable of modifications and that I do not desire to be limited in the interpretation of the following claims except as may be necessitated by the state of the prior art.

What I claim as new, and desire to secure by Letters Patent of the United States, is—

1. In a multicolor-press, the combination with a plurality of type-beds, of a rotary member, a plurality of platens movably mounted on the rotary member, means for rotating the member intermittently to bring the platens successively in register with the type-beds, and means for moving the platens independently of the rotary member while the latter is at rest into contact with the type-beds.

2. In a multicolor-press, the combination with a plurality of stationary type-beds, of the plurality of coöperating platens, means for moving said platens to bring them successively in register with said type-beds, paper-feeding mechanism for automatically supplying each platen with a sheet of paper as it passes a certain point in its movement, and means for moving said platens to take an impression when they are in register with the type-beds.

3. In a multicolor-press, the combination with a plurality of type-beds, of a rotary member, a plurality of platens movably mounted on the rotary member, means for rotating the member intermittently to bring the platens successively in register with the type-beds, and means for moving the platens simultaneously and independently of the rotary member while the latter is at rest into contact with the type-beds.

4. In a multicolor-press, the combination with the framework carrying a plurality of stationary type-beds, of a rotary member carrying a plurality of pivoted platens, means for rotating said member to bring the platens successively in register with the type-beds, and means for moving the platens on their pivots to contact with the type-beds when in register therewith.

5. In a multicolor-press, the combination with the plurality of stationary type-beds, of the plurality of moving platens adapted to register successively with said type-beds, paper-feeding mechanism for feeding a sheet of paper to each platen as it passes a certain point, inking mechanism for each of the type-beds, and means for moving the platens to contact with the type-beds while the platens are in register therewith.

6. In a multicolor-press, the combination with the stationary type-beds, of the platens, means for moving the platens, to register successively with the type-beds, inking mechanism for each of said type-beds, and means for moving the platens to contact with the type-beds when they are in register therewith so that blanks carried by the platens will be printed.

7. In a multicolor-press, the combination with the stationary type-beds grouped at equal radial distances from a common center, of the shaft concentric with the general outline of said beds, the spider loosely mounted on said shaft, the platens pivoted on the spider, toggle-links between said shaft and platen, and a lock for said spider; the parts being so arranged that the movement of the shaft when the spider is locked will cause the platens to be moved to contact with the type-beds with which they are in register, and the movement of the shaft when the spider is unlocked serves to carry the spiders and platens into a new registration with the type-beds.

8. In a multicolor-press, the combination with the stationary type-beds grouped at equal radial distances from a common center, of the shaft concentric with the general outline of said type-beds, the spider loosely mounted on said shaft, means for locking said spider in certain positions of adjustment, a disk rigidly secured to said shaft, platens pivoted to the outer ends of the arms of the spider, and links connecting the disk and the platens whereby the movement of the shaft while the spider is locked serves to take the impressions, and the movement of the shaft when the spider is unlocked serves to advance it and the spider to bring the platens to a new registration.

9. In a multicolor-press, the combination with the stationary type-beds grouped at equal radial distances from a common center, of the shaft mounted concentrically with the general outline of said type-beds, the spiders loosely mounted thereon near the ends of said shaft, the platens pivoted between the opposite arms of said spiders, the disks secured upon the shaft between the spiders, means for locking said spiders from movement, and the links connecting said disks and platens so that the movement of the shaft when the spiders are locked will cause the platens to be brought into contact with the type-beds, and the movement of the shaft when the spiders are unlocked will cause the spiders and platens to be advanced to a new registration.

10. In a multicolor-press, the combination with the stationary type-beds grouped at equal radial distances from a common center, of the shaft concentric with the general outline of said beds, the spider loosely mounted on said shaft, means for locking said spider from movement, platens pivoted to the outer ends of the arms of said spider, a disk on the shaft, and links connecting said platens and said disk, the arrangement of parts being such that when the shaft is rotated forward with the spider unlocked the spider and platens will be carried to a new registration, when a further movement of the shaft in the same direction with the spider locked will cause the platens to be moved into contact with the type-beds and retracted, when a further movement of the shaft in the same direction with the spider unlocked will cause the spider and platens to be moved to a fresh registration, and finally when the movement of the shaft is reversed and with the spider locked from movement the platens will be moved outward to contact with the type-beds.

11. In a multicolor-press, the combination with the stationary type-beds grouped at equal radial distances from a common center, of the shaft concentric with the general outline of said beds, the spider loosely mounted on said shaft, means for locking said spider from movement, platens pivoted to the outer ends of the arms of said spider, a disk on the shaft, and links connecting said platens and said disk, the arrangement of parts being such that when the shaft is rotated forward with the spider unlocked the spider and platens will be carried to a new registration, when a further movement of the shaft in the same direction with the spider locked will cause the platens to be moved into contact with the type-beds and retracted, when a further movement of the shaft in the same direction with the spider unlocked will cause the spider and platens to be moved to a fresh registration, and finally when the movement of the shaft is reversed and with the spider locked from movement the platens will be moved outward to contact with the type-beds, and means for giving said shaft a cycle of movements consisting of three forward movements and a reverse movement.

12. In a multicolor-press of the class described in which the spider is alternately locked from movement and then allowed to move, the frame, a spider mounted to rotate therein, a locking mechanism consisting of a cam-disk mounted on a shaft, a yoke on the end of each arm of the spider, and a pivoted lever extending from the cam to the yoke and adapted to be forced into engagement with said yoke by the cam when the spider is to be locked from movement.

13. In a printing-press, the combination with a movable platen, of the clamps mounted thereon and adapted to occupy clamping or non-clamping positions, springs adapted to hold said clamps yieldingly in either position, and fingers adapted to engage said clamps to move them from one to the other position as the platen moves.

14. In a printing-press, the combination with the movable platens and a type-form with which they are successively brought in register by a movement continuously forward, means for reciprocating said platens transversely to the line of movement at each registration, of the paper-clamps pivoted on the ends of said platens, and cam-fingers suitably located so that when the platen reaches its discharge position and is moved outward for the printing stroke the clamps will contact with the cam-fingers and be opened thereby.

15. In a printing-press, the combination with the moving platen occupying successive positions, and means for reciprocating it, of the clamps pivotally mounted on the ends thereof, and cam-fingers so located that when the platen is moved out and returned at the feeding position the clamps by contact with the said cam-fingers will be brought down on the platen to secure the paper in position.

16. In a printing-press, the combination with the movable platens occupying successively the discharge and feed positions, means for reciprocating said platen transversely to the line of movement at each position of the clamps pivotally mounted on the ends thereof, and duplicate cam-fingers, said fingers being adapted to be contacted by the clamps as the platens are moved outward and inward in said discharge and feed positions to respectively open the clamps and discharge the paper and to close the clamps to secure the new sheet.

17. In a printing-press, the combination with the platen, of the clamping-bars movable to and from and coöperating with the surface of said platen, the yielding rim formed on the under surface of the clamps to produce a vacuum-cavity, and the valve communicating with said cavity to permit the escape of the air therein as the clamps are brought down upon the surface of the platen.

18. In a printing-press, the combination with the platen, of the paper-clamps movably mounted thereon and adapted to coöperate therewith to hold a sheet of paper in place upon the platen, the rubber rim or boss surrounding the under surface of the clamps, the apertures through said clamps communicating with the vacuum-chamber formed by the rubber rim, and the leaf-spring valve coöperating with said aperture; substantially as and for the purpose described.

19. In a multicolor-press, the combination with a plurality of type-beds facing a common center, of a plurality of coöperating platens, means for moving said platens to bring them successively in register with said beds, and means for moving them to take an impression when they are in register.

20. In a multicolor-press, the combination with a shaft, a plurality of type-beds grouped about the shaft, a rotatable member on the shaft, a plurality of platens on the rotatable member, means for rotating the member intermittently to bring the platens successively in register with the type-beds, means for locking the rotatable member between its intermittent movements, and connections between the shaft and the platens whereby when the rotatable member is locked and the shaft turned the platens are moved to take an impression from the type-beds.

In testimony whereof I affix my signature in presence of two witnesses.

CHARLES WILLIAMS.

Witnesses:
E. MOLITOR,
J. McROBERTS.